United States Patent [19]

Makino et al.

[11] 4,411,702

[45] Oct. 25, 1983

[54] METHOD FOR SHEET FORMING A GYPSUM HARDENED BODY

[75] Inventors: Yoshio Makino; Yoshihiko Murata; Toshiaki Kakinuma, all of Saitama; Masaharu Yamaguchi; Naoyuki Fujisawa, both of Chiba, all of Japan

[73] Assignees: Mitsubishi Mining & Cement Company Ltd.; Mitsubishi Cement Asbestos Company Ltd.; Toray Silicone Company Ltd., all of Tokyo, Japan

[21] Appl. No.: 357,636

[22] Filed: Mar. 12, 1982

Related U.S. Application Data

[63] Continuation-in-part of Ser. No. 199,670, Oct. 22, 1980, abandoned.

[30] Foreign Application Priority Data

Oct. 31, 1979 [JP]   Japan ................................ 54/141115

[51] Int. Cl.³ ............................................. C04B 11/14
[52] U.S. Cl. ................................................... 106/111
[58] Field of Search ................................ 106/109, 111

[56] References Cited

U.S. PATENT DOCUMENTS

| | | | |
|---|---|---|---|
| 3,318,839 | 5/1967 | Weissbach | 106/111 |
| 3,455,710 | 7/1969 | Nitzsche et al. | 106/111 |
| 3,623,895 | 11/1971 | Nitzsche et al. | 106/111 |
| 4,136,687 | 1/1979 | Dabroski | 106/111 |

*Primary Examiner*—James Poer
*Attorney, Agent, or Firm*—E. J. Brenner

[57] ABSTRACT

A method for sheet forming a remarkably waterproof gypsum hardened body, in which a main component consisting of gypsum dihydrate, slag and calcium hydroxide and additives are added with a part of the main component coated with a hydrophobic diorganopolysiloxane fluid having a kinetic viscosity of 10–10,000 CS at 25° to be sheet formed and cured. The hydrophobic diorganopolysiloxane fluid is uniformly dispersed through the sheet formed gypsum hardened body and its strong water repelling property makes the gypsum hardened body remarkably waterproof to be used suitably as both interior and outdoor construction materials.

5 Claims, 1 Drawing Figure

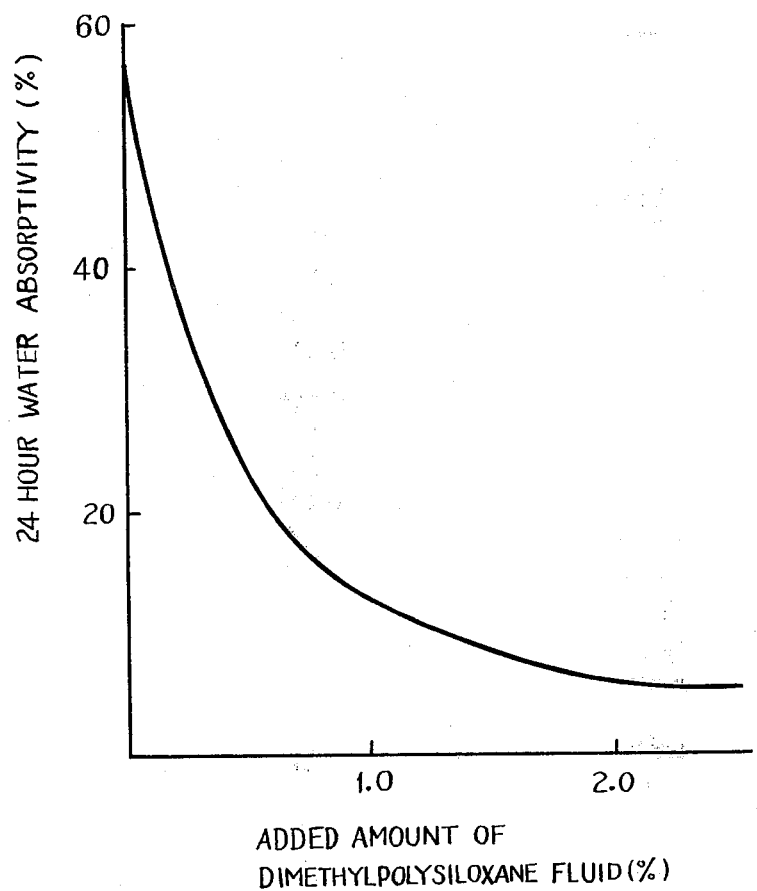

METHOD FOR SHEET FORMING A GYPSUM HARDENED BODY

CROSS-REFERENCE TO RELATED APPLICATIONS

The present application is a continuation-in-part of co-pending patent application Ser. No. 199,670, filed on Oct. 22, 1980, now abandoned.

BACKGROUND OF THE INVENTION

The present invention relates to a method for sheet forming a gypsum hardened body which is composed mainly of gypsum dihydrate, slag and calcium hydroxide and is remarkably waterproof.

A method for sheet forming a gypsum hardened body which is composed mainly of gypsum dihydrate and slag mixed with fibrous reinforcing agents has been disclosed in U.S. Pat. No. 4,146,402. However, as the gypsum hardened body of the above disclosed method has a water absorptivity going up to about 60% in the 24 hour water absorption test, it has proved to be unsatisfactorily durable due to its deterioration caused by permeation, freezing and melting of water during its use as an outdoor board having a small bulk specific gravity. Especially, as the above disclosed hardened body contains a large quantity of gypsum dihydrate, the gypsum dihydrate can be dissolved by permeation of water. Therefore, it is more deteriorated during its use as an outdoor construction material than other gypsum dihydrate free hardened bodies, which comprise for example, portland cement, slag cement and mortar.

As a counterplan therefor, a method of applying a resin coating on the surface of a hardened body manufactured in factories has been carried out. However, even in this method, as the cut end of a hardened body cutted at construction fields absorbs water, it is required to apply a resin coating on the cut end thereof again.

Therefore, it is desirable to apply a waterproofing treatment also to the whole inner part of the hardened body for preventing water absorption through the cut end thereof.

Upon such demand, the present inventors began to investigate a method in which a waterproofing treatment of the inner part of a hardened body can be carried out simultaneously with manufacturing of a board. That is because it is difficult to apply conventional waterproofing treatment methods as such to a gypsum hardened body which is manufactured by sheet forming and is intended to be used mainly as an outdoor board. The above conventional waterproofing treatment methods are methods which use various kinds of waterproofing agents for construction materials on the markent such as paraffin emulsion, sodium methlsiliconate, silicone emulsion, metal soap and silicone powder.

A method for manufacturing a board by sheet forming is a method in which raw materials are made to be dispersed uniformly into a large quantity of water to be slurried and the thus obtained uniform slurry is molded by a sheet forming machine mainly into a board under filtration of the large quantity of water contained in the slurry. The molded board has two uniform plane surfaces. As a sheet forming machine, HATSCHEK machine is generally used.

In the method for sheet forming a gypsum hardened body composed mainly of gypsum dihydrate and slag, the use of the above conventional waterproofing agents proved to be ineffective as follows:

(1) Paraffin emulsion

Paraffin emulsion is made to be distributed not uniformly in the coarse of the sheet forming. Further, when the molded body is hardened by hydration, the hydrate accumulates around the water repelling paraffin, resulting in a disappearance of the water repellence thereof. Foam is also generated, thereby making a long run operation impossible.

(2) Sodium methylsiliconate

Sodium methylsiliconate is water soluble and flows away with a filtrate. Further, it makes the surface of the slag water repellent, resulting in a bad hardening.

(3) Silicone emulsion

Silicone emulsion flows away with a filtrate and is attached to a filter cloth to be harmful for sheet forming. As it contains an emulsifing agent, it is responsible for foaming. Even when the quantity of the emulsifing agent is small, the filtrate is recycled through a closed system for prevention of environmental pollution, consequently the emulsifing agent is gradually concentrated in the filtrate, making a long run operation impossible. Thus, foaming presents a significant problem for a long run operation.

(4) Metal soap

Metal soap can not be easily dissolved or dispersed uniformly in water. When dissolved, it generates foam, making an operation of a sheet forming machine impossible. Further, hydration reaction is disturbed by the foaming, resulting in a bad hardening.

(5) Silicone powder

As silicone powder has a strong water repellence, it can not be dispersed into water uniformly. Even when dispersed, it comes up to the surface of the water or becomes dispersed unequally before molding. Further, even when added in a mixed state with other powders, it also becomes dispersed unequally before sheet forming. As it is a solid, it is dispersed later on the surface of a molded body and can not exhibit a satisfactory water repellent effect. Another method which uses methylpolysiloxane fine powder having a particle size of under 1$\mu$m has been proposed. However, even this methylpolysiloxane fine powder could not satisfactorily be dispersed. Further, it proved to be difficult to pulverize methylpolysiloxane finely to a particle size of under 1$\mu$m.

Thus, the conventional waterproofing treatment method was impractical owing to the defects described above.

The present invention has been devised by overcoming the above defects of the conventional waterproofing treatment method.

BRIEF SUMMARY OF THE INVENTION

The object of the present invention is to provide a method for sheet forming a gypsum hardened body which is composed mainly of gypsum dihydrate, slag and calcium hydroxide and is remarkably waterproof.

According to the present invention, there is provided:

In the method for sheet forming a gypsum hardened body from a mixed material composed of a main component consisting of gypsum dihydrate, slag and calcium hydroxide and additives improvements comprising adding a part of said main component coated with hydrophobic diorganopolysiloxane fluid of the general formula

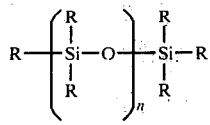

in which R represents a nonsubstituted monovalent hydrocarbon radical or a halogenated monovalent hydrocarbon radical and n represents a positive integral number to said mixed material.

The present invention will be better understood from the following detailed description taken in connection with the accompanying drawing in which:

The single FIGURE is a graph representing the relation between an added amount of dimethylpolysiloxane fluide and a 24 hour water absorptivity of a gypsum hardened body of the present invention.

DETAILED DESCRIPTION OF THE INVENTION

As described above, the present invention is a method for sheet forming a gypsum hardened body having a very small water absorptivity which is combined with an improved waterproofing treatment method using hydropobic diorganopolysiloxane fluid as a waterproofing agent.

The hydrophobic diorganopolysiloxane fluid is represented by the following general formula

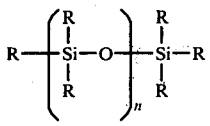

in which R represents a nonsubstituted monovalent hydrocarbon radical or a halogenated monovalent hydrocarbon radical and n represents a positive integral number. Concretely, the nonsubstituted monovalent hydrocarbon radicals are exemplified by alkyl radical such as methyl-, ethyl-, octyl radical, cycloalkyl radical such as cyclohexyl radical, aralkyl radical such as 2-phenylpropyl-, 1-phenylpropyl radical, aryl radical such as phenyl-, naphthyl radical, and alkenyl radical such as vinyl-, allyl radical, and the halogenated monovalent hydrocarbon radicals are exemplified by halogenated alkyl radical such as 3-chloropropyl radical, 3,3,3-trifluoropropyl radicl and halogenated aryl radical such as p-fluorophenyl radical.

The diorganopolysiloxane fluid has the following characteristic properties:

(1) As it is insoluble in water, it does not flow away with a filtrate even in the course of sheet forming.

(2) It contains no foaming part.

(3) It can be dispersed uniformly into a slurry and a board product is uniformly waterproof.

(4) It generates no bad hardening which brings decrease of the strength of a board product.

The kinetic viscosity of the diorganopolysiloxane fluid is within the range from 10 to 10,000 CS at 25° C. When it is under 10 CS, the diorganopolysiloxane fluid tends to evaporate during agitation and also to decrease the weather resistance, and when over 10,000 CS, the agitation effect decreases with incrase of the kinetic viscosity thereof.

The added amount of the diorganopolysiloxane fluid to the mixed material is within the range from 0.2 to 2.5 weight %, preferably within the range from 0.5 to 1.5 weight %. When the added amount is under 0.2 weight %, the waterproofing property of an obtained gypsum hardened body is decreased, and when over 2.5 weight %, the gypsum hardened body is no longer improvable in the waterproofing property and is economically disadvantageous.

For coating a part of the powdery main component with the diorganopolysiloxane fluid, a method in which a part of the main component is agitated mechanically and then added with the diorganopolysiloxane fluid to be mixed uniformly is preferable.

The coating amount of the diorganopolysiloxane fluid for the main component is preferably within the range from 5 to 40 weight parts of the diorganopolysiloxane fluid for 100 weight parts of the main component. When the coating amount is under 5 weight %, the powdery main component flies as dust in mixing, making the waterproofing effect decreased, and when over 40 weight %, the main component becomes granular owing to occurrence of adhesion and makes the dispersibility thereof decreased when mixed with additives.

Of the main component, calcium hydroxide has a specific surface area larger than that of the other two components of the main component, consequently the oil absorptivity thereof is larger. Therefore, as an object which is to be coated with the diorganopolysiloxane fluid, single calcium hydroxide is preferable. In this case, the single calcium hydroxide coated with the diorganopolysiloxane fluid is mixed with the two components of the main component.

The additives which constitute the mixed material with the main component comprise a reinforcing fiber, a light weight material, an alkali stimulative, a hardening accelarator and a viscosity improver and are used reasonably at need.

Thus, the mixed material composed of the main component containing the part thereof coated with the diorganopolysiloxane fluid as described above and the additives is added with water 10 times as heavy as the mixed material to be mixed into an uniform slurry. The uniform slurry is molded by a sheet forming machine into a board.

As the diorganopolysiloxane fluid is insoluble in water and adheres to the part of the main component in a state of fluid, it does not flow away with a filtrate nor attach to a filter cloth even in the course of sheet forming. Further, as it contains no foaming part, no foam is generated.

The thus obtained board is then cured to be hardened. When an early curing is required, steam curing is preferable. Hydration reaction is promoted by curing, and a strength and a waterproofing property respectively required for a board product appear. The appearance of the waterproofing property is dependent on the diorganopolysiloxane fluid dispersed uniformly through the molded body. The diorganopolysiloxane fluid is insoluble in water and does not prevent hydration of other components at the early stage. Therefore, the strength does not be decreased. With progress of hydration, the diorganopolysiloxane fluid diffuses gradually and uniformly into the inner part of the molded body. The thus obtained molded body can exhibit the waterproofing property required.

As definitely described above, the gypsum hardened body sheet formed by the present invention has an extraodinarily small water absorptivity and is excellent in durability and weather resistance, therefore it is very useful for both interior and outdoor construction materials.

The present invention will be understood more readily with reference to the following example. The example, however, is intended to illustrate the present invention and is not construed to limit the scope of the present invention. The gypsum dihydrate used in the example is a by-product gypsum obtained by exhaust gas desulfurization and the slag is a crushed water granulated slag of blast furnace having a specific surface area of 3,800 cm$^2$/g. Further, in the example, the terms part and % refer to respectively weight part and weight %.

EXAMPLE

This example is a case in which a part of a main component to be coated with dimethylpolysiloxane fluid is calcium hydroxide. Namely, industrial calcium hydroxide coated with dimethylpolysiloxane fluid is prepared by mixing uniformly 80 parts of industrial calcium hydroxide and 20 parts of dimethylpolysiloxane fluid having a kinetic viscosity of 500 CS at 25° C. by use of a forced agitator.

Next, a mixed material composed of 34 parts of gypsum dihydrate and 34 parts of slag and additives consisting of 10 parts of asbestos (Chrysotile) as a reinforcing fiber, 20 parts of pearlite as a light weight material, 1 part of aluminium sulfate as a hardening accelarator and 1 part of calcium hydroxide as an alkali stimulative is added respectively with 0, 0.2, 0.5, 1.0, 1.5, 2.0, 2.5% in dimethylpolysiloxane equivalent of the industrial calcium hydroxide coated with dimethylpolysiloxane fluid and further added with water 10 times as heavy as the mixed material to be mixed uniformly into a slurry. The respective slurry is molded by use of a cylinder machine into a board which is then natural cured for 14 days to a gypsum hardened body. After the thus obtained respective hardened body is dried at 60° C., the 24 hour water absorptivity thereof is measured. The result of the determinations is shown in the figure. The physical properties of the following 3 kinds of hardened bodies are shown in table 1.

TABLE 1

| added amount of dimethyl- polysiloxane (%) | bending strength (kgf/cm$^2$) | bulk specific gravity (—) | water absorptivity (%) |
| --- | --- | --- | --- |
| 2.5 | 95 | 0.85 | 6.0 |
| 1.0 | 96 | 0.86 | 12.1 |
| 0 | 98 | 0.86 | 56.2 |

COMPARATIVE EXAMPLE

Instead of calcium hydroxide coated with dimethylpolysiloxane used in Example, calcium hydroxide coated with metal soap, paraffin emulsion, sodium methylsiliconate, silicone emulsion (dimethylpolysiloxane emulsion concentration 25%), silicone powder(methylpolysesquioxane powder) respectively is used. The other conditions are the same as that of Example. The physical properties of the obtained hardened bodies are shown in Table 2. In the case of metal soap, foam makes the sheet forming impossible. Paraffin and silicone emulsion make a long run operation

TABLE 2

| waterproofing agent | added amount (%) | bending strength (kgf/cm$^2$) | bulk specific gravity (—) | 24 hour water absorptivity (%) |
| --- | --- | --- | --- | --- |
| metal soap | 1 | — | — | — |
|  | 2.5 | — | — | — |
| paraffin emulsion | 1 | 83 | 0.84 | 53 |
|  | 2.5 | 80 | 0.87 | 48 |
| sodium methyl- siliconate | 1 | no hardening | — | — |
|  | 2.5 | " | — | — |
| silicone emulsion | 4 | 87 | 0.83 | 51 |
|  | 10 | 78 | 0.85 | 42 |
| silicone powder | 1 | 34 | 0.83 | 48 |
|  | 2.5 | 35 | 0.83 | 40 |

—: determination is impossible

What is claimed is:

1. A method for sheet forming a gypsum hardened body from a mixed material composed of a main component consisting of gypsum dihydrate, slag and calcium hydroxide and additives in which said main components are added together and mixed with water to form a slurry, said slurry is molded into the form of a sheet and said sheet is hardened by curing, wherein the improvement comprises adding a part of said main component coated with hydrophobic diorganopolysiloxane fluid of the general formula

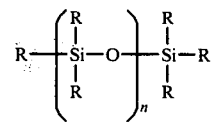

in which R represents a nonsubstituted monovalent hydrocarbon radical or a halogenated monovalent hydrocarbon radical and n represents a positive integral number to said mixed material.

2. A method for sheet forming a gypsum hardened body as claimed in claim 1 wherein the added amount of said hydrophobic diorganopolysiloxane fluid is within the range from 0.2 to 2.5 weight % of said mixed material.

3. A method for sheet forming a gypsum hardened body as claimed in claim 1 wherein the kinetic viscosity of said hydrophobic diorganopolysiloxane fluid is within the range from 10 to 10,000 CS at 25° C.

4. A method for sheet forming a gypsum hardened body as claimed in any one of claims 1-3, wherein said hydrophobic diorganopolysiloxane fluid is dimethylpolysiloxane fluid.

5. A method for sheet forming a gypsum hardened body as claimed in claim 1, wherein said part of the main component coated with said hydrophobic diorganopolysiloxane fluid is calcium hydroxide.

* * * * *